No. 743,832. PATENTED NOV. 10, 1903.
A. G. COUCH.
HORSE COLLAR.
APPLICATION FILED JUNE 4, 1903.
NO MODEL. 3 SHEETS—SHEET 1.
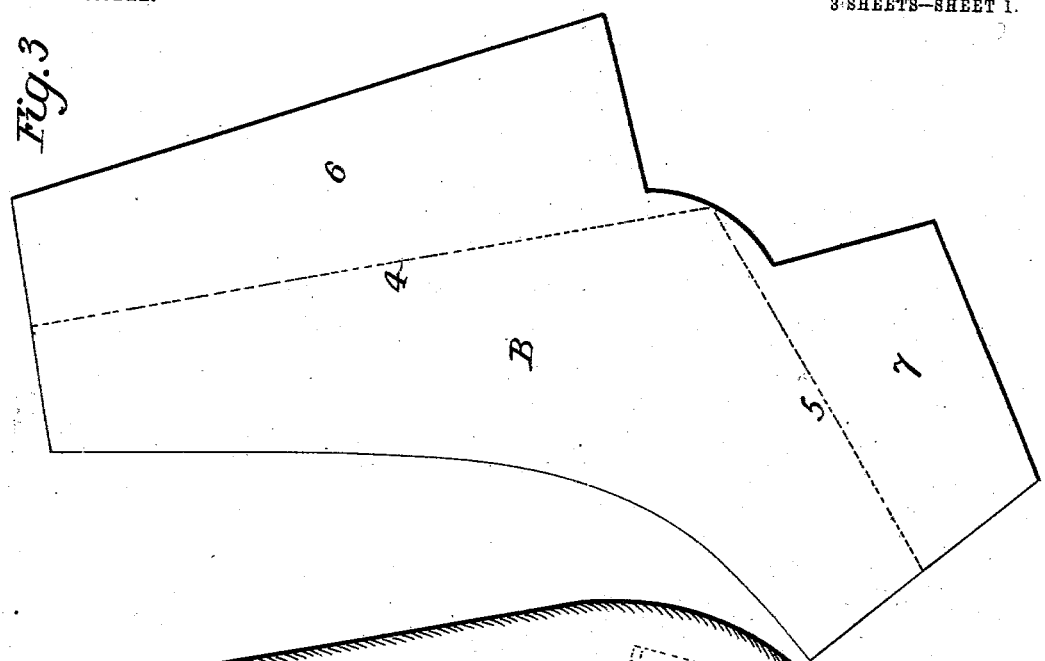
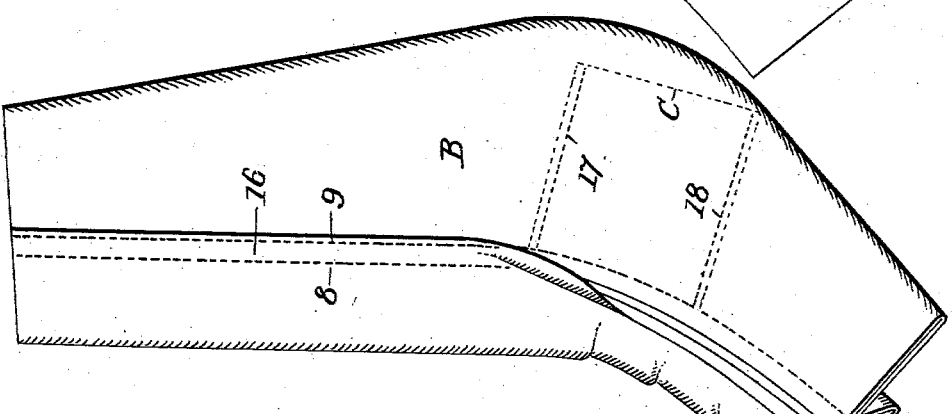
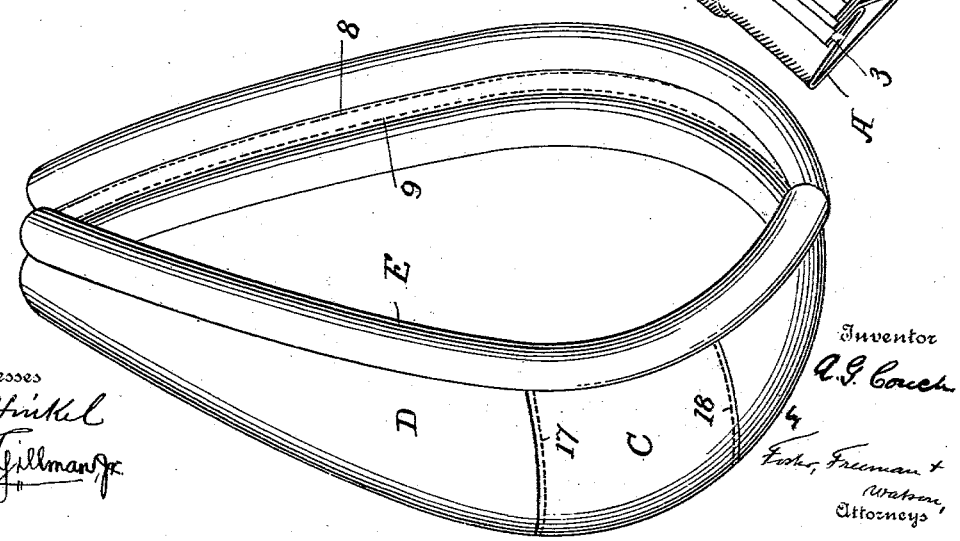
Witnesses
Inventor
A. G. Couch
Attorneys No. 743,832. PATENTED NOV. 10, 1903.
A. G. COUCH.
HORSE COLLAR.
APPLICATION FILED JUNE 4, 1903.
NO MODEL. 3 SHEETS—SHEET 2.
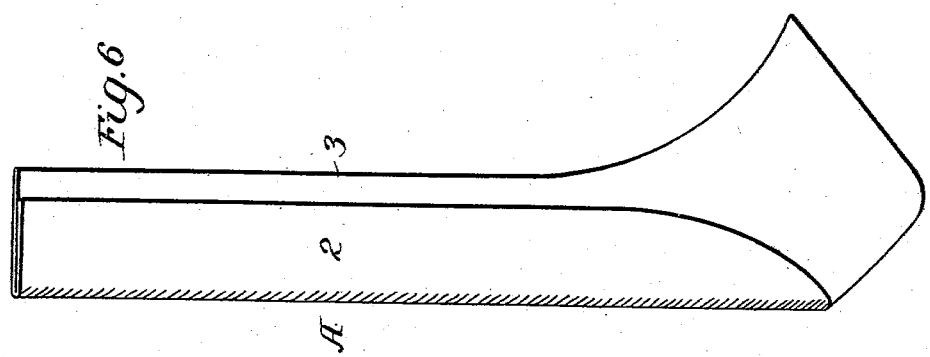
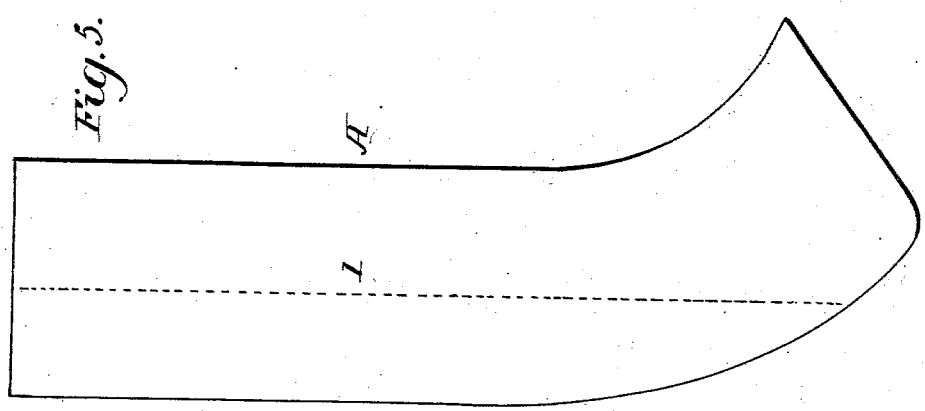
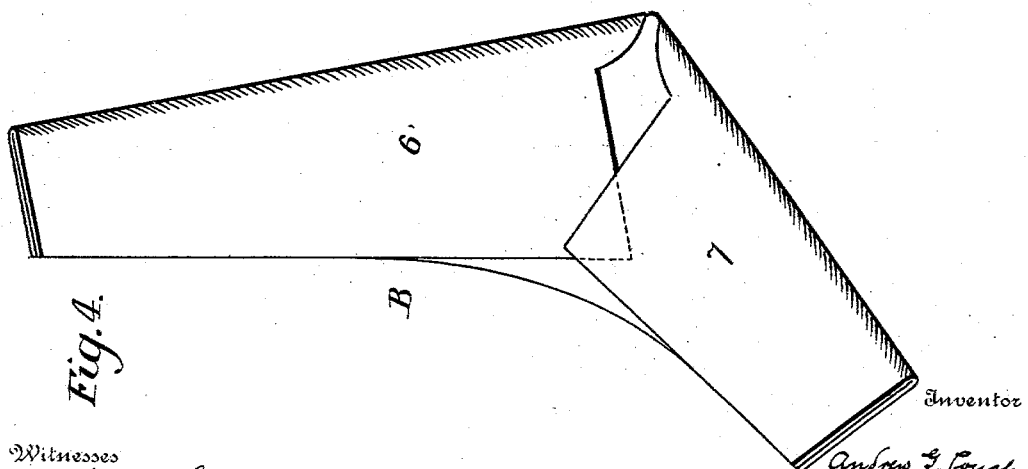

No. 743,832. PATENTED NOV. 10, 1903.
A. G. COUCH.
HORSE COLLAR.
APPLICATION FILED JUNE 4, 1903.
NO MODEL. 3 SHEETS—SHEET 3.

No. 743,832. Patented November 10, 1903.

UNITED STATES PATENT OFFICE.

ANDREW GEO. COUCH, OF MEMPHIS, TENNESSEE, ASSIGNOR TO COUCH BROTHERS & J. J. EAGAN CO., OF ATLANTA, GEORGIA, A CORPORATION OF GEORGIA.

HORSE-COLLAR.

SPECIFICATION forming part of Letters Patent No. 743,832, dated November 10, 1903.

Application filed June 4, 1903. Serial No. 160,094. (No model.)

*To all whom it may concern:*

Be it known that I, ANDREW GEORGE COUCH, a citizen of the United States, residing at Memphis, in the county of Shelby and State of Tennessee, have invented certain new and useful Improvements in Horse-Collars, of which the following is a specification.

My invention relates to horse-collars made of fabric; and it consists in constructing each casing of two strips folded upon themselves and with overlapping edges, one of which is extended so as to cover the edges of the other portion and secured by stitching to form an outside seam, as fully set forth hereinafter and as illustrated in the accompanying drawings, in which—

Figure 11:
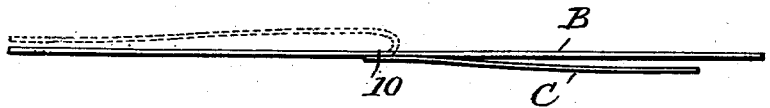
Figure 12:
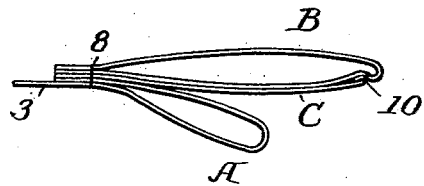

Figure 1 is a perspective view of my improved collar. Fig. 2 is a view showing the manner in which the two strips are brought together in the act of uniting them to form one of the casings. Fig. 3 is a plan showing the form of the body-strip of one of the casings. Fig. 4 shows the said strip when folded upon itself prior to uniting it to the other strip. Fig. 5 is a plan of the strip from which the roll is made. Fig. 6 is a view showing the roll-strip folded upon itself. Figs. 7 to 10 are cross-sectional views illustrating the manner in which the strips are brought together and connected. Figs. 11 and 12 are cross-sectional views illustrating the manner in which the wearing-piece is applied to the body-strip.

Each casing of the collar consists of two sheets or strips A B of suitable fabric united at the edges without turning inside out, as heretofore, so as to form the body D, Fig. 1, and the roll E, the latter being of substantially uniform diameter throughout, while the body tapers toward each end and has an external wearing-piece C. The sheet A, from which the roll is made, is of substantially uniform width, curved to one side at the lower end, as shown in Fig. 5, and is folded along the line 1, Fig. 5, so that the fold 2 will not cover the fold beneath it, but leave a projecting portion 3.

The sheet B, from which the body portion is made, consists of a piece cut away to form two projecting portions 6 7, which are folded upon the remaining portion on lines 4 5, Fig. 3, to nearly cover the portion beneath it, as illustrated in Fig. 4, the opening between the parts 6 7 being covered in the completed collar by the wearing-piece C.

Figure 7:
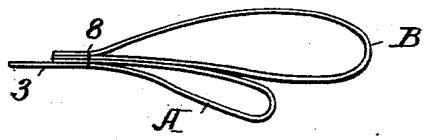
Figure 8:
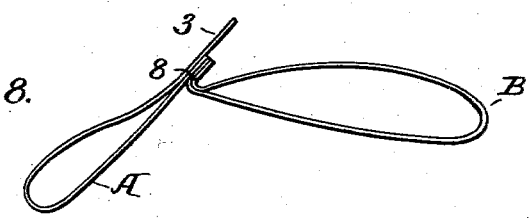
Figure 9:
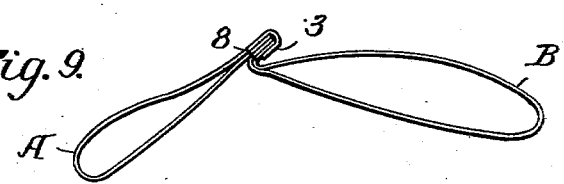
Figure 10:
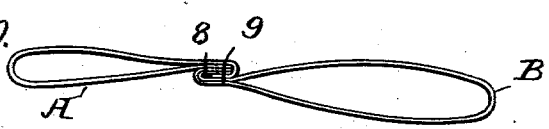

In connecting the parts together for one side or casing of the collar the folded strip A with the widest portion undermost is laid beneath the overlapping parts of the strip B, as shown in Fig. 7, the edges of the part B practically coinciding with the edge of the narrower portion of the strip A, leaving the projection 3 extending beyond said edges beneath the same, as shown in Fig. 7. The parts are then united by a row of stitches 8, running parallel to the edges of the parts, after which the portion A is swung from below the portion B, so as to carry the free edges over the top of the said portion to the position shown in Fig. 8. The projecting portion 3 is then turned down across the free edges and underneath the same to the position shown in Fig. 9, and the lapped edges are then pressed down upon the part B and united thereto by a row of stitches 9, parallel to the row of stitches 8, thus forming a seam 16 at one side of the casing secured by the two rows of stitches 8 9, only one of which, however, extends to the opposite side of the casing.

While the wearing-piece may be secured in any desired manner, it is preferably connected to the section B while the latter is flat, as shown in Fig. 11, by a row of stitches 10 passing through the strip B and through the piece C, as shown in Fig. 11, after which the strip B is folded over on itself, as shown in dotted lines, Fig. 11, while the piece C is also swung inward and against the under side of the strip B to the position shown in Fig. 12, and its side edges are secured by rows of stitching 17 18, as shown in dotted lines, Fig. 2, thereby concealing the seam 10. The edge of the piece C is then inserted between the parts A B, as shown in Fig. 12, and is united thereto when these parts are connected by the seam 8, as illustrated in Figs. 7 to 10, the opposite edge of the piece C being thereby concealed and sewed in place. After the parts have thus been connected together with any desired number of wearing-pieces the different pockets are suitably filled, thus forming the collar, as shown in Fig. 1.

It will be seen that by the construction described I not only avoid turning the casings inside out after connecting them, as in prior constructions, but I connect the pieces of each casing simply by two seams, saving thread and time in manufacture and reducing the cost of construction. Further, it will be seen that the raw edges of the parts are covered and concealed, so that they cannot possibly become exposed and ravel out, while the seam is so strengthened that it will actually resist any of the strains tending to separate the parts, the collar, in fact, being reinforced by the seam, so that it is stronger at this point than at any other. The line of stitching 9 not only hides the raw edges and strengthens this part of the collar, but makes the crevice between the roll and the main body for the hames, while the first line of stitches 8 is practically concealed and not exposed to wear, so that there will be no separation along this line in use. It will also be seen that the inner and outer edges of the wearing-piece are effectually covered, so that they do not present any raw edges at the outside of the collar.

Without limiting myself to the precise construction shown, I claim as my invention—

1. A horse-collar section consisting of two strips A, B each folded upon itself, the folded strips connected by a row of stitches 8 adjacent to the edges of the strips, and one part of one of the strips lapped around the edges of the other strip, and the whole connected by a row of stitches passing through all the strips adjacent to the lapped edge, substantially as set forth.

2. A horse-collar section consisting of two parts each composed of a folded strip of fabric, one of the edges of one of the parts lapped around and under the inturned edges of the other part and the parts connected by two parallel rows of stitches 8, 9, the latter extending through all of the parts and the former extending through all except the outer part of the body-strip, substantially as described.

3. The combination in the casing of a horse-collar of two sections each folded upon itself to form the body portion and the roll portion respectively, and the edges of the body portion turned inward upon said portion, and the edges of the roll portion lying outside of those of the body portion, and one of them folded around said edges and the whole secured by rows of stitching 8, 9, substantially as set forth.

4. A collar-section consisting of a body portion and a roll portion each composed of a strip folded upon itself, the edges of the two strips overlapping, and a wearing-piece C connected at one edge to a fold of the body portion and its opposite edge extending between the edges of said strips, and one edge of one of the strips being folded around the other edges of said strips, and the edge of the wearing-piece, and secured beneath the same by stitching connecting the two strips and the wearing-piece together, substantially as set forth.

5. A collar-section consisting of a body portion and a roll each composed of a strip folded upon itself, the edges of the two strips overlapping, and one edge of one of the strips folded around the edges of the other to cover the same, and secured beneath the same by stitching connecting the two strips together, substantially as set forth.

In testimony whereof I have signed my name to this specification in the presence of two subscribing witnesses.

ANDREW GEO. COUCH.

Witnesses:
O. C. JOHNSON,
G. M. MILLER.